(12) United States Patent
Sun et al.

(10) Patent No.: US 10,536,195 B2
(45) Date of Patent: Jan. 14, 2020

(54) OVERLAPPING CLUSTER ARCHITECTURE FOR COORDINATED MULTIPOINT (COMP)

(71) Applicant: QUALCOMM Incorporated, San Diego, CA (US)

(72) Inventors: Jing Sun, San Diego, CA (US); Xiaoxia Zhang, San Diego, CA (US); Taesang Yoo, San Diego, CA (US); Siddhartha Mallik, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/684,823

(22) Filed: Aug. 23, 2017

(65) Prior Publication Data

US 2018/0062708 A1 Mar. 1, 2018

Related U.S. Application Data

(60) Provisional application No. 62/379,981, filed on Aug. 26, 2016.

(51) Int. Cl.
*H04H 20/71* (2008.01)
*H04B 7/024* (2017.01)
(Continued)

(52) U.S. Cl.
CPC .............. *H04B 7/024* (2013.01); *H04L 45/46* (2013.01); *H04B 7/0626* (2013.01); (Continued)

(58) Field of Classification Search
CPC .... H04B 17/318; H04B 7/024; H04B 7/0626; H04B 7/0632; H04L 45/46; H04L 5/0053; H04W 56/002; H04W 56/0065
See application file for complete search history.

(56) References Cited

U.S. PATENT DOCUMENTS

| 9,350,515 B2 | 5/2016 | Tellado et al. |
| 2014/0198766 A1* | 7/2014 | Siomina ............. H04W 72/082 370/330 |

(Continued)

FOREIGN PATENT DOCUMENTS

WO  WO-2013025158 A1  2/2013

OTHER PUBLICATIONS

International Search Report and Written Opinion—PCT/US2017/048374—ISA/EPO—dated Dec. 11, 2017.

(Continued)

*Primary Examiner* — Minh Trang T Nguyen
(74) *Attorney, Agent, or Firm* — Patterson & Sheridan, LLP

(57) ABSTRACT

Techniques for overlapping cluster architecture for coordinated multipoint (CoMP) are provided. According to certain aspects, a method of wireless communication by a transmission point is provided. The method generally includes receiving, from a first base station, a first signal for a first user equipment (UE) to transmit over the air, receiving, from a second base station, a second signal for a second UE to transmit over the air, and combining the first and the second signals from the first and second base stations and transmitting the combined signal to the first and second UE.

24 Claims, 16 Drawing Sheets

(51) Int. Cl.
*H04L 12/715* (2013.01)
*H04B 17/318* (2015.01)
*H04B 7/06* (2006.01)
*H04L 5/00* (2006.01)
*H04W 56/00* (2009.01)

(52) U.S. Cl.
CPC .......... *H04B 17/318* (2015.01); *H04L 5/0053* (2013.01); *H04W 56/002* (2013.01); *H04W 56/0065* (2013.01)

(56) References Cited

U.S. PATENT DOCUMENTS

| | | | |
|---|---|---|---|
| 2015/0172015 A1* | 6/2015 | Won | H04L 5/0035 370/329 |
| 2015/0373572 A1 | 12/2015 | Sahin et al. | |
| 2016/0021526 A1 | 1/2016 | Niu et al. | |
| 2016/0094318 A1* | 3/2016 | Shattil | H04B 7/026 375/267 |
| 2016/0219498 A1 | 7/2016 | Abraham et al. | |
| 2016/0270031 A1 | 9/2016 | Sundaresan et al. | |
| 2016/0352394 A1* | 12/2016 | Boudreau | H04B 7/024 |

OTHER PUBLICATIONS

Matsuo D., et al., "Shared Remote Radio Head Architecture to Realize Semi-Dynamic Clustering in CoMP Cellular Networks", 2012 IEEE Globecom Workshops (GC WKSHPS 2012): Anaheim, California, USA, Piscataway, NJ, Dec. 3, 2012, pp. 1145-1149, XP032341540, DOI: 10.1109/GLOCOMW.2012.6477740, ISBN: 978-1-4673-4942-0.

\* cited by examiner

OVERLAPPING CLUSTER ARCHITECTURE FOR COORDINATED MULTIPOINT (COMP)

This application claims priority to U.S. Provisional Application Ser. No. 62/379,981, entitled "OVERLAPPING CLUSTER ARCHITECTURE FOR COORDINATED MULTIPOINT (COMP)", filed on Aug. 26, 2016, which is expressly incorporated by reference in its entirety.

FIELD

Aspects of the present disclosure relate generally to wireless communications systems, and more particularly, to overlapping cluster architecture for coordinated multipoint (CoMP).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access). NR is a set of enhancements to the LTE mobile standard promulgated by Third Generation Partnership Project (3GPP). It is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

In an aspect, a method for wireless communications is provided. The method may be performed, for example, by a transmission point. The method generally includes receiving, from a first base station, a first signal for a first user equipment (UE) to transmit over the air, receiving, from a second base station, a second signal for a second UE to transmit over the air, and combining the first and the second signals from the first and second base stations and transmitting the combined signal to the first and second UE.

In an aspect, a method for wireless communications is provided. The method may be performed, for example, by a base station. The method generally includes generating a first signal for a User Equipment (UE) served by the base station, and transmitting, the first signal to multiple transmission points, for transmission to the UE by the multiple transmission points, wherein at least one of the multiple transmission points is part of at least two clusters of transmission points.

In an aspect, a method for wireless communications is provided. The method may be performed, for example, by a user equipment. The method generally includes receiving, from a transmission point, a first signal, and identifying the identity of one or more transmission points based on the first signal, wherein at least one of the transmission points is part of at least two clusters of transmission points.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
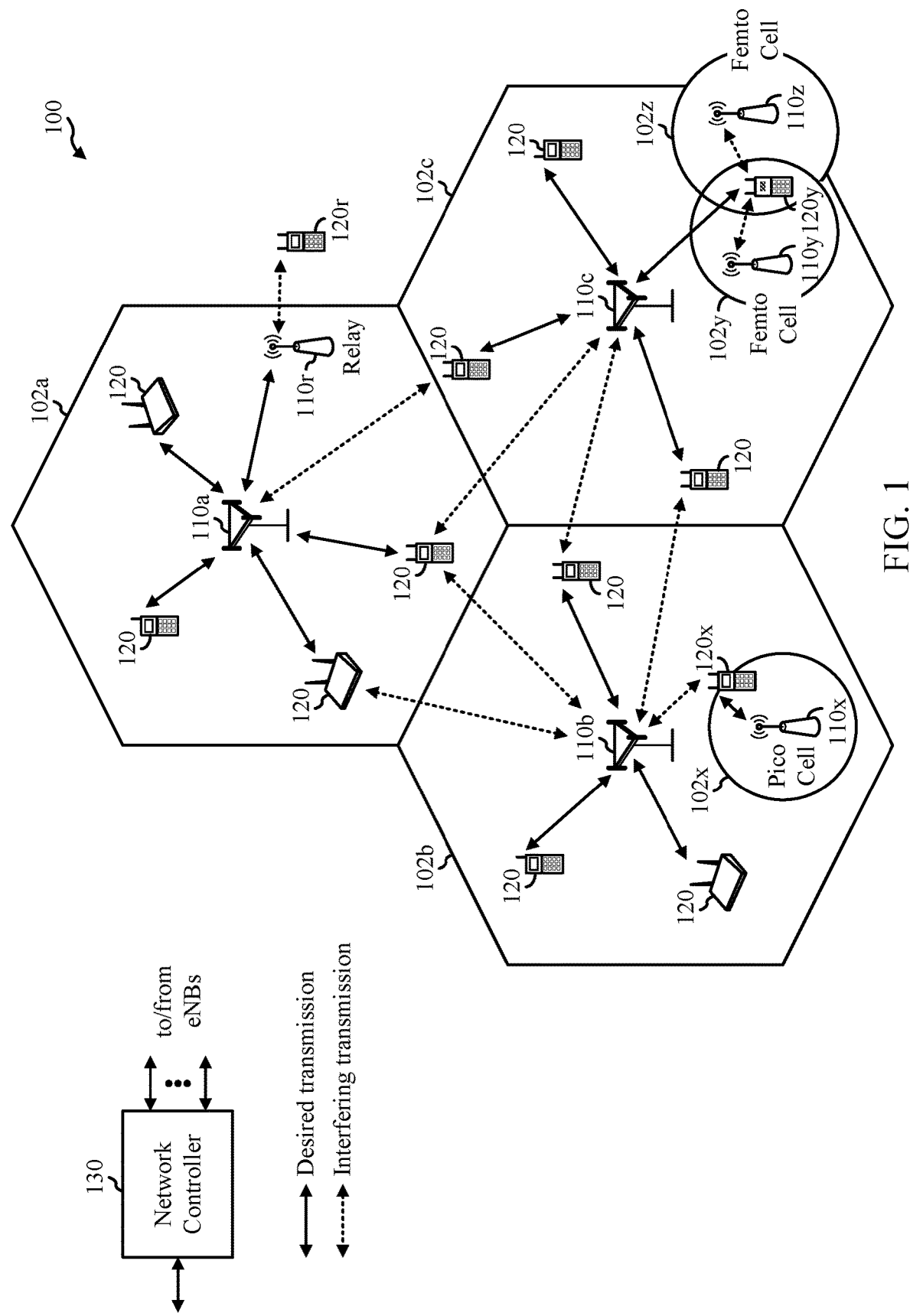
FIG. 1 is a block diagram conceptually illustrating an example telecommunications system, according to aspects of the present disclosure.

Conventional CoMP deployments may include a macro cell and its associated small cells where each small cell is associated with a single macro cell. In an aspect, the macro cell includes a Node B and each of the small cells includes a transmission point (TP). According to aspects of the present disclosure, TPs may comprise nodes of various types capable of transmitting to a UE and these nodes may not have significant processing power. For example, a TP includes one or more antennas and may be fiber connected to a Node B for backhaul. In some cases, the TP does not perform any TP side processing except to convert Radio Frequency (RF) signals to a format compatible with the fiber connection to the Node B. Generally, a set of TPs is fiber connected to one Node B. A set of one or more TPs connected to a Node B comprises a cluster. In one example, a star structure is used to connect an eNB to a set of TPs forming the cluster. In certain aspects, if each TP is connected to just one Node B, the clusters will be non-overlapping and resulting in cluster boundaries.

According to aspects of the present disclosure, a set of TPs operating as a part of a CoMP deployment (e.g., cluster of TPs) may include a CoMP Coordination Set (CCS) comprising a set of TPs which are close to and serve a particular UE. For an UL transmission, the TPs in the CCS may comprise the TPs capable of receiving an UL transmission from the UE with a reasonable strength. For a DL transmission, the DL transmission from the TPs in the CCS will be reasonably strong when received by the UE. A cluster serving a UE may be referred to as a serving cluster and the serving cluster generally includes (at least partially) a CoMP coordination set (CCS) of the UE. The CCS may be used for both UL and DL transmissions. Where a UE receives signals from TPs that are part of another cluster other than the UE's serving cluster, the other cluster is an interfering cluster. Interfering clusters may contain one or more of the TPs in the CCS of a UE.

In certain aspects, as noted above, if each TP is connected to just one Node B, the clusters will be non-overlapping and resulting in cluster boundaries as discussed below. With non-overlapping clusters, the UE may get caught up in a situation where the UE is located between the two cluster boundaries and the UE's CCS rides across the cluster boundaries. In other words, the UE's CCS may have TPs in both the non-overlapping clusters. This may lead to non-efficient ZF and/or SLR. In certain aspects, a cluster structure allowing overlapping of clusters may ensure that the UE's CCS is always completely covered by at least one cluster. A TP may be fiber connected to one or more Node Bs. A set of one or more TPs connected to a Node B comprises a cluster of TPs and a single TP may be a member of one or more clusters if the single TP is connected to multiple Node Bs, thus leading to overlapping clusters.

Aspects of the present disclosure provide apparatus, methods, processing systems, and computer program products for new radio (NR) (new radio access technology) cell measurement. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and polar. NR cell may refer to a cell operating according to the new air interface or fixed transport layer. A NR Node B (e.g., 5G Node B) may correspond to one or multiple transmission reception points (TRPs, e.g., transmission points (TPs)).

NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some cases DCells may transmit SS. TRPs may transmit downlink signals to UEs indicating the cell type. Based on the cell type indication, the UE may communicate with the TRP. For example, the UE may determine TRPs to consider for cell selection, access, handover, and/or measurement based on the indicated cell type.

In some cases, the UE can receive measurement configuration from the RAN. The measurement configuration information may indicate ACells or DCells for the UE to measure. The UE may monitor/detect measurement reference signals from the cells based on measurement configuration information. In some cases, the UE may blindly detect MRS. In some cases the UE may detect MRS based on MRS-IDs indicated from the RAN. The UE may report the measurement results.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network may be new radio or 5G network. UEs 120 may configured to perform the operations 1200 discussed in more detail below for determining a cell type of a cell and communicating with the cell based on the determination. Node B 110 may comprise a transmission reception point (TRP) configured to perform the operations 1300 discussed in more detail below for identifying the cell type and providing an indication of the cell type to the UE 120. The NR network may include the central unit. The new radio network 100 may comprise a central unit 140 configured to perform the operations 1400 discussed in more detail below for determining cell types for TRPs and configuring the TRPs with the cell types. According to certain aspects, the UEs 120, Node B 110 (TRP), and central unit 140 may be configured to perform operations related to measurement configuration, measurement reference signal transmission, monitoring, detection, measurement, and measurement reporting, which are described in greater detail below.

The system illustrated in FIG. 1 may be, for example, a long term evolution (LTE) network. The wireless network 100 may include a number of Node Bs (e.g., evolved NodeBs (eNB), 5G Node B, etc.) 110 and other network entities. A Node B may be a station that communicates with the UEs and may also be referred to as a base station, an access point, etc. A Node B and 5G Node B are other examples of stations that communicates with the UEs.

Each Node B 110 may provide communication coverage for a particular geographic area. In 3GPP, the term "cell" can refer to a coverage area of a Node B and/or a Node B subsystem serving this coverage area, depending on the context in which the term is used.

A Node B may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A Node B for a macro cell may be referred to as a macro Node B. A Node B for a pico cell may be referred to as a pico Node B. A Node B for a femto cell may be referred to as a femto Node B or a home Node B. In the example shown in FIG. 1, the Node Bs 110a, 110b and 110c may be macro Node Bs for the macro cells 102a, 102b and 102c, respectively. The Node B 110x may be a pico Node B for a pico cell 102x. The Node Bs 110y and 110z may be femto Node Bs for the femto cells 102y and 102z, respectively. A Node B may support one or multiple (e.g., three) cells.

The wireless network 100 may also include relay stations. A relay station is a station that receives a transmission of data and/or other information from an upstream station (e.g., a Node B or a UE) and sends a transmission of the data and/or other information to a downstream station (e.g., a UE or a Node B). A relay station may also be a UE that relays transmissions for other UEs. In the example shown in FIG.

1, a relay station 110r may communicate with the Node B 110a and a UE 120r in order to facilitate communication between the Node B 110a and the UE 120r. A relay station may also be referred to as a relay Node B, a relay, etc.

The wireless network 100 may be a heterogeneous network that includes Node Bs of different types, e.g., macro Node Bs, pico Node Bs, femto Node Bs, relays, transmission reception points (TRPs), etc. These different types of Node Bs may have different transmit power levels, different coverage areas, and different impact on interference in the wireless network 100. For example, macro Node Bs may have a high transmit power level (e.g., 20 Watts) whereas pico Node Bs, femto Node Bs and relays may have a lower transmit power level (e.g., 1 Watt).

The wireless network 100 may support synchronous or asynchronous operation. For synchronous operation, the Node Bs may have similar frame timing, and transmissions from different Node Bs may be approximately aligned in time. For asynchronous operation, the Node Bs may have different frame timing, and transmissions from different Node Bs may not be aligned in time. The techniques described herein may be used for both synchronous and asynchronous operation.

A network controller 130 may couple to a set of Node Bs and provide coordination and control for these Node Bs. The network controller 130 may communicate with the Node Bs 110 via a backhaul. The Node Bs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro Node Bs, pico Node Bs, femto Node Bs, relays, etc. In FIG. 1, a solid line with double arrows indicates desired transmissions between a UE and a serving Node B, which is a Node B designated to serve the UE on the downlink and/or uplink. A dashed line with double arrows indicates interfering transmissions between a UE and a Node B.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

Figure 2:
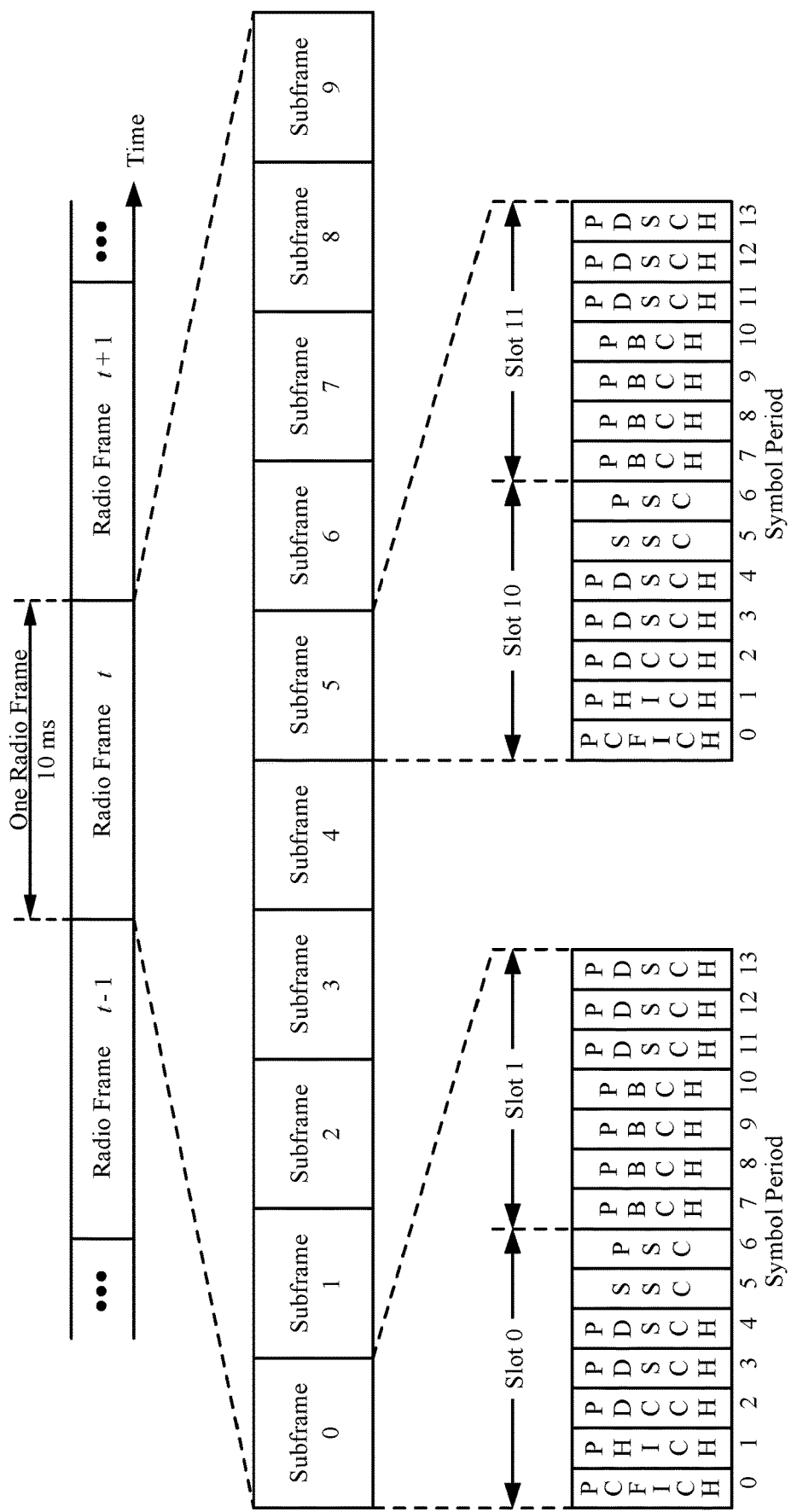
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE, a Node B may send a primary synchronization signal (PSS) and a secondary synchronization signal (SSS) for each cell in the Node B. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The Node B may send a Physical Broadcast Channel (PBCH) in symbol periods 0 to 3 in slot 1 of sub-frame 0. The PBCH may carry certain system information.

The Node B may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The Node B may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The Node B may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The Node B may send the PSS, SSS and PBCH in the center 1.08 MHz of the system bandwidth used by the Node B. The Node B may send the PCFICH and PHICH across the entire system bandwidth in each symbol period in which these channels are sent. The Node B may send the PDCCH to groups of UEs in certain portions of the system bandwidth. The Node B may send the PDSCH to specific UEs in specific portions of the system bandwidth. The Node B may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one sub-carrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A Node B may send the PDCCH to the UE in any of the combinations that the UE will search.

A UE may be within the coverage of multiple Node Bs. One of these Node Bs may be selected to serve the UE. The serving Node B may be selected based on various criteria such as received power, path loss, signal-to-noise ratio (SNR), etc.

Figure 3:
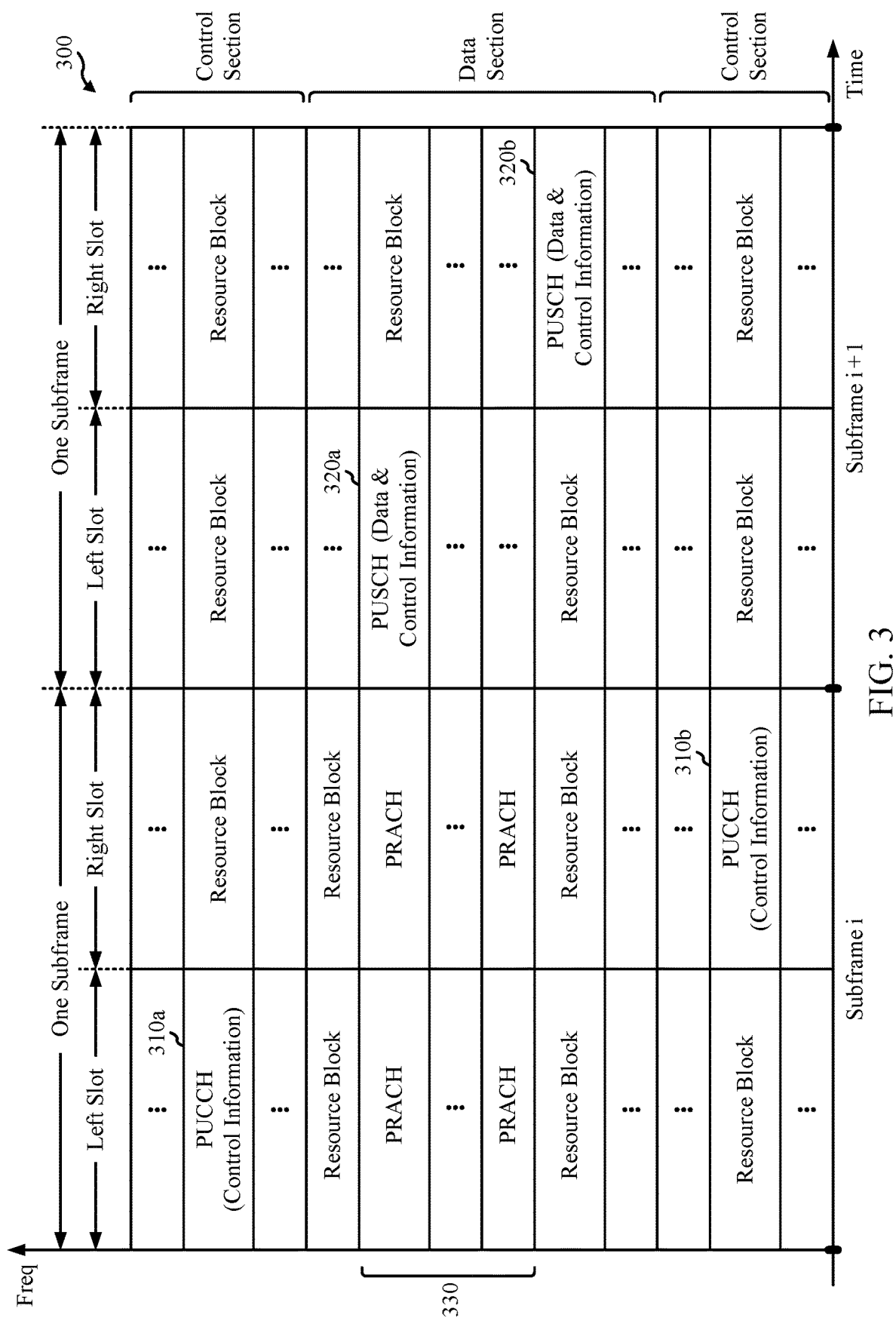
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310*a*, 310*b* in the control section to transmit control information to a Node B. The UE may also be assigned resource blocks 320*a*, 320*b* in the data section to transmit data to the Node B. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 330. The PRACH 330 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
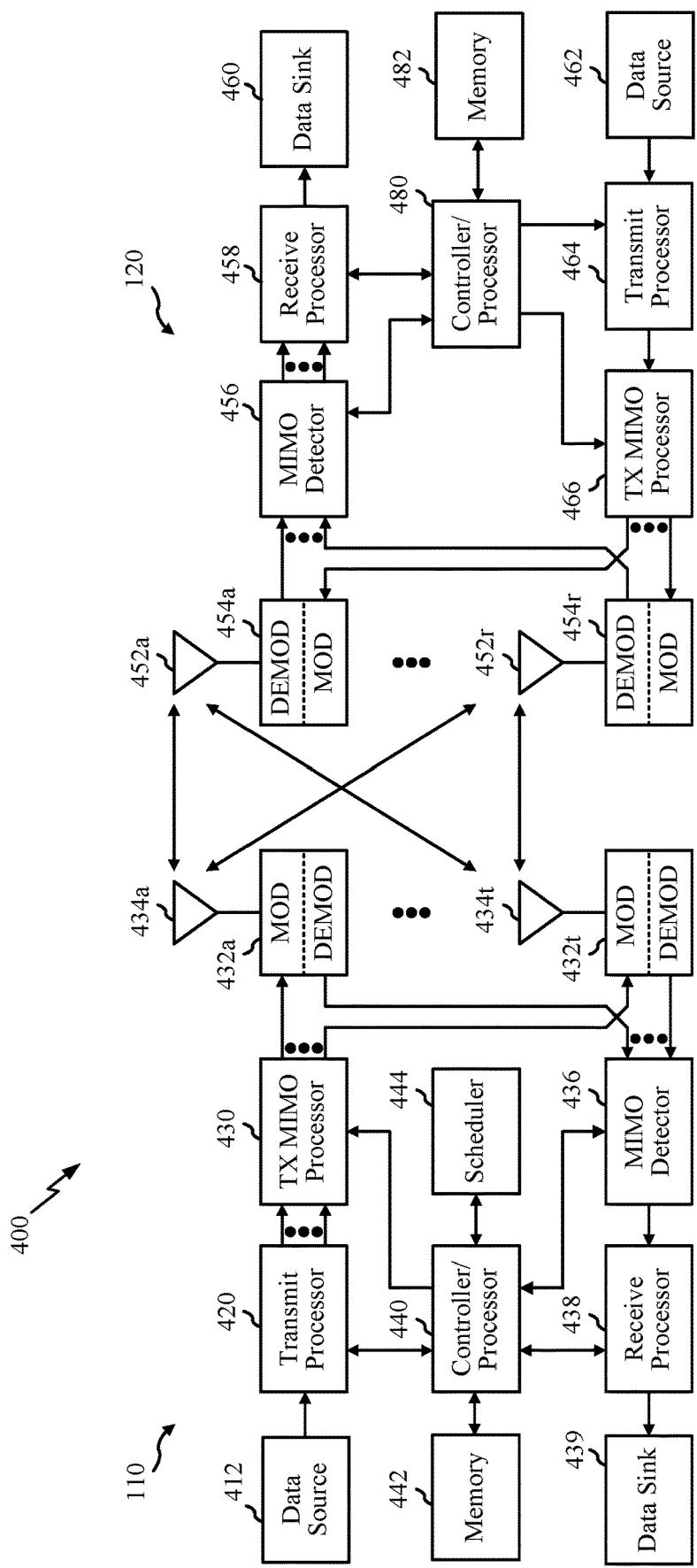
FIG. 4 is a block diagram conceptually illustrating a design of an example Node B and user equipment (UE), according to aspects of the present disclosure.

FIG. 4 illustrates example components of the base station/ Node B 110 and UE 120 illustrated in FIG. 1, which may be used to implement aspects of the present disclosure. One or more components of the AP 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 12-14.

FIG. 4 shows a block diagram of a design of a base station/Node B 110 and a UE 120, which may be one of the base stations/Node Bs and one of the UEs in FIG. 1. For a restricted association scenario, the base station 110 may be the macro Node B 110*c* in FIG. 1, and the UE 120 may be the UE 120*y*. The base station 110 may also be a base station of some other type. The base station 110 may be equipped with antennas 434*a* through 434*t*, and the UE 120 may be equipped with antennas 452*a* through 452*r*.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein. The processor 480 and/or other processors and modules at the UE 120 may also perform or direct, e.g., the execution of the functional blocks illustrated in FIGS. 12-14, and/or other processes for the techniques described herein. The memories 442 and 482 may store data and program codes for the base station 110 and the UE 120, respectively. A scheduler 444 may schedule UEs for data transmission on the downlink and/or uplink.

Figure 5:
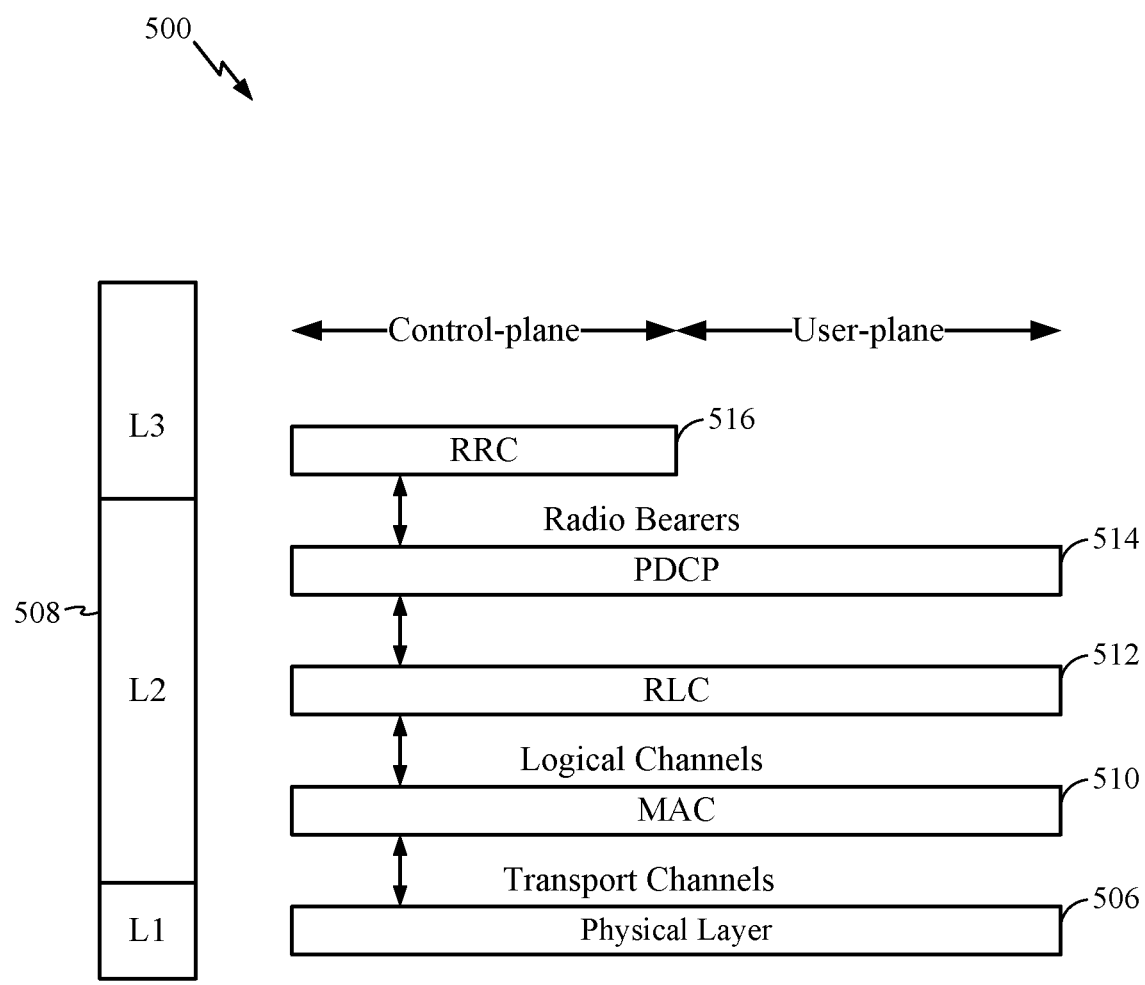
FIG. 5 is a diagram illustrating an example radio protocol architecture for the user and control planes, according to aspects of the present disclosure.

FIG. 5 is a diagram 500 illustrating an example of a radio protocol architecture for the user and control planes in LTE. The radio protocol architecture for the UE and the Node B is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and Node B over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the Node B on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between Node Bs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and Node B is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the Node B and the UE.

Figure 6:
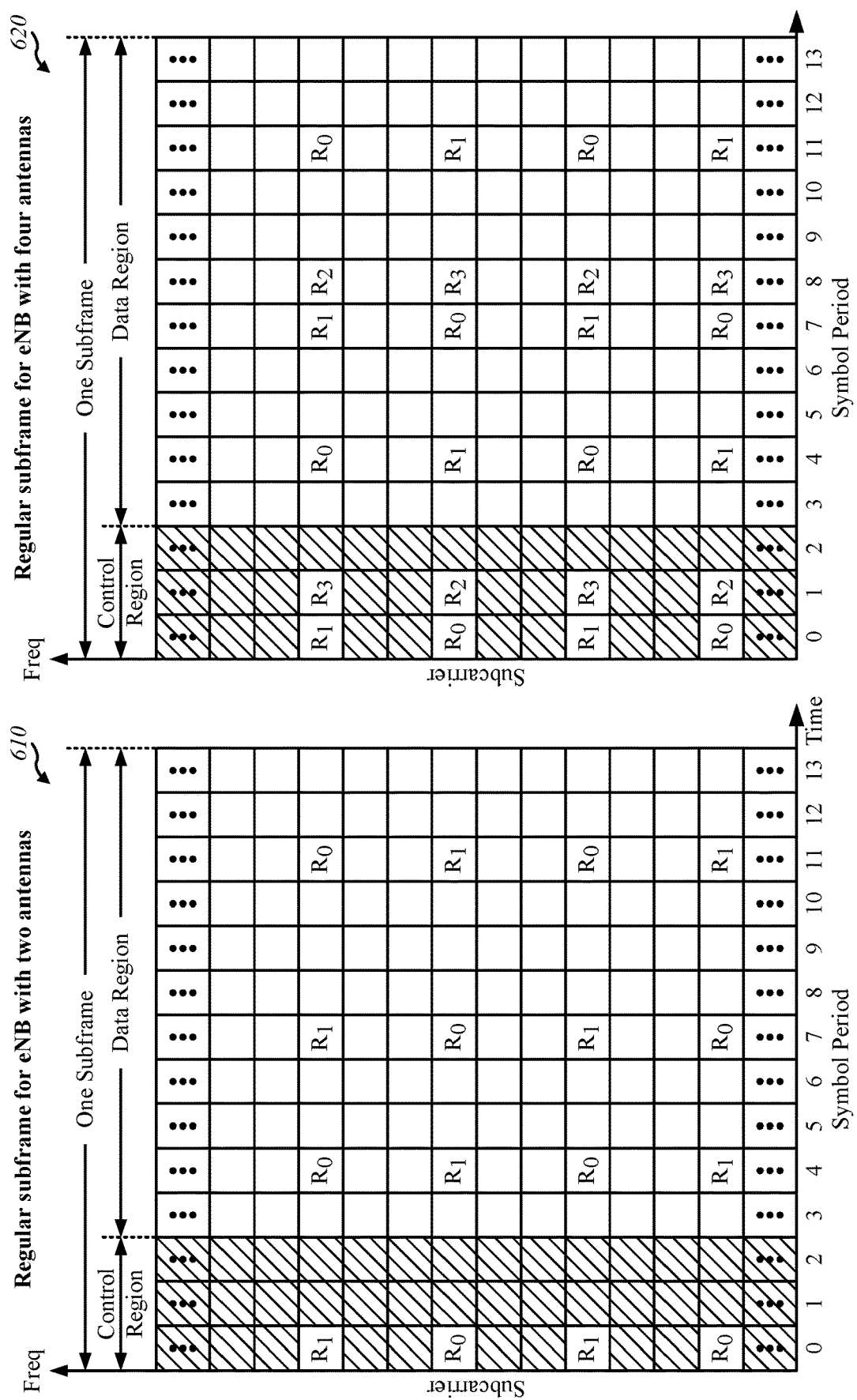
FIG. 6 illustrates an example subframe resource element mapping, according to aspects of the present disclosure.

FIG. 6 shows two exemplary subframe formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for a Node B equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for a Node B equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different Node Bs may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., a Node B) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple Node Bs. One of these Node Bs may be selected to serve the UE. The serving Node B may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering Node Bs.

The wireless network may also support coverage enhancement by coordinated multipoint (CoMP) transmission. For CoMP, multiple transmission points (e.g., Node Bs or UEs) coordinate to better serve a UE on a downlink or uplink. Transmission points may coordinate to reduce interference (e.g., with some transmission points restricting transmission during times others are to transmit). Multiple transmission points may also transmit simultaneously to achieve higher transmit power. Similarly, multiple transmission points may coordinate to serve a UE separately or simultaneously on the uplink.

CoMP may be supported via certain transmission modes. For example, in LTE Release 11, CoMP may be supported in DL transmission mode 10. In this case, a UE can be configured with multiple CSI processes, and may provide separate CSI feedback for each CSI process. Each CSI process may involve one non-zero-power (NZP) CSI-RS configuration used for channel measurement and one interference measurement resource (IMR) configuration (e.g., derived from zero-power (ZP) CSI-RS configuration) used for interference measurement.

Each CSI process may be viewed as being associated with one or more cells of the multiple cells involved in CoMP operation for the UE. A UE may also be dynamically indicated with a set of parameters for PDSCH rate matching and a NZP CSI-RS configuration for Quasi-co-location (QCL) operation (e.g., with DM-RS and/or CRS).

Figure 7:
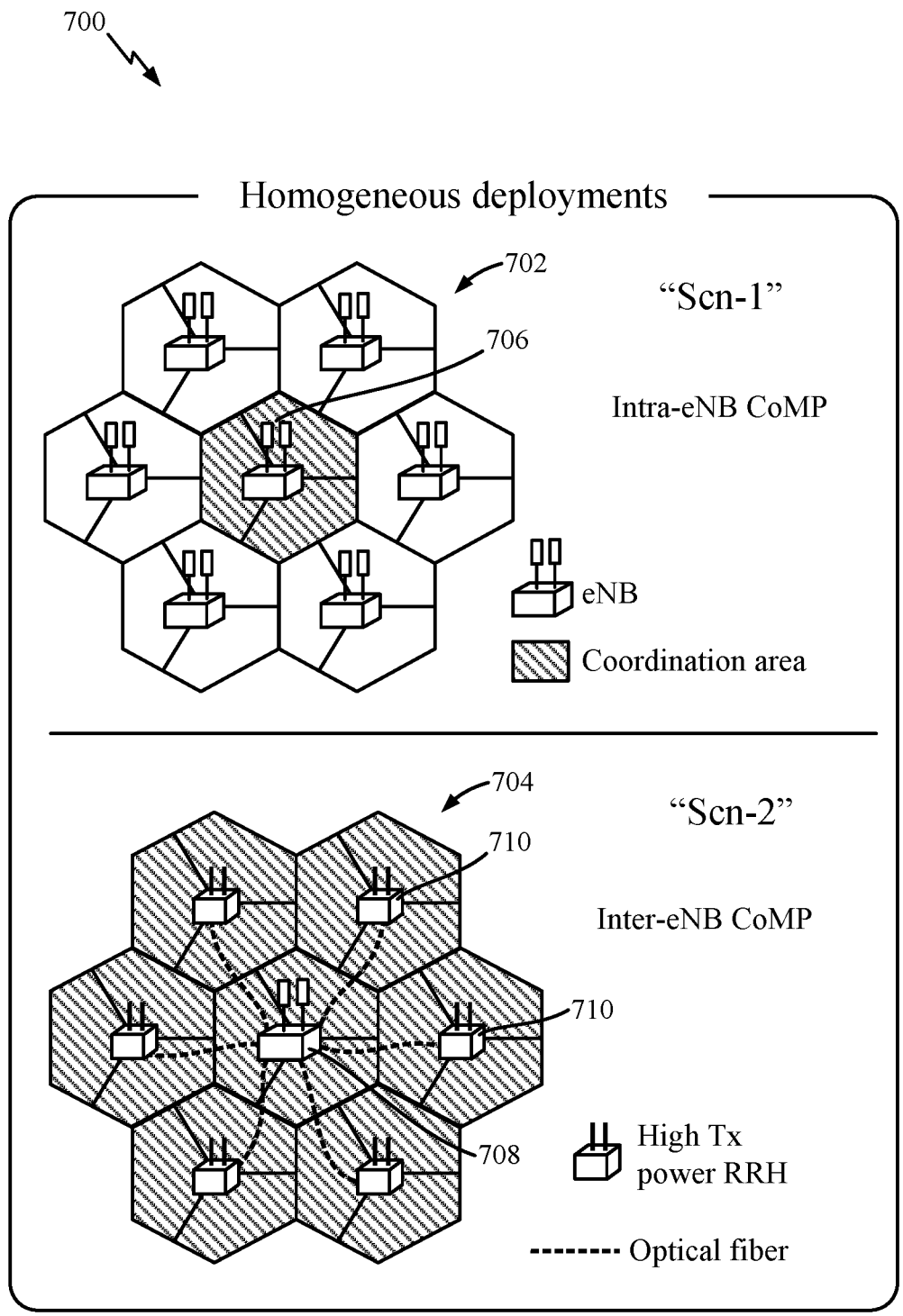
FIGS. 7 and 8 illustrate different CoMP deployment scenarios, according to aspects of the present disclosure.
Figure 8:
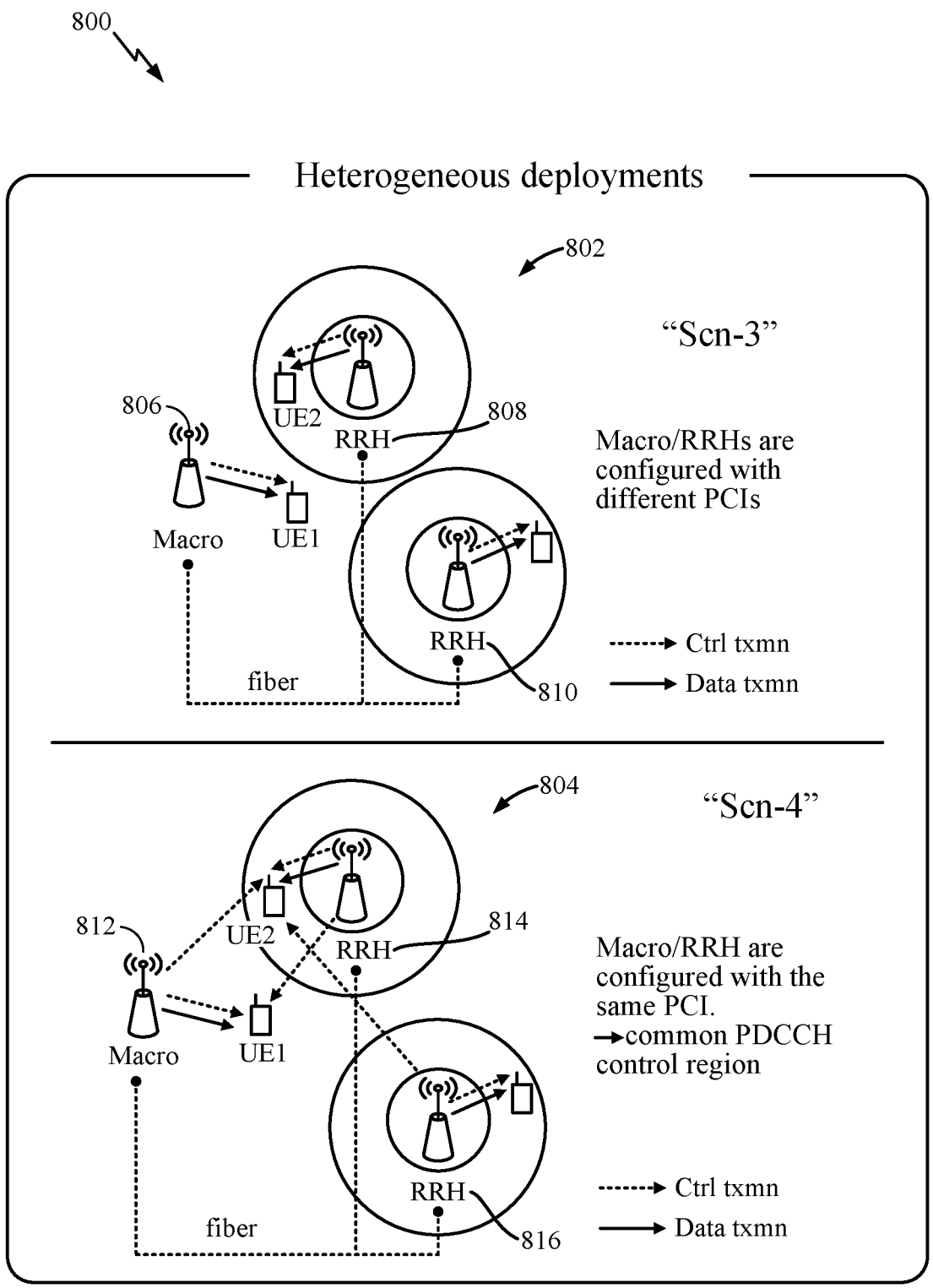

FIGS. 7 and 8 illustrate different CoMP deployment scenarios. As illustrated in FIG. 7, in homogeneous deployment examples 702 and 704, a group of transmission points of the same type (e.g., macro eNBs) may be deployed to serve a UE. In the example 702, a single eNB (e.g., eNB 706) may serve the UE, wherein a plurality of eNBs may be connected through intra-eNB CoMP. In the example 704, a plurality of eNBs may serve the UE simultaneously, wherein a macro eNB 708 may be connected with high transmit (Tx) power remote radio heads (RRHs) 710 using optical fibers making the example system 704 inter-eNB CoMP.

As illustrated in FIG. 8, in heterogeneous deployment examples 802 and 804, a group of transmission points (TPs) of different types (e.g., a macro eNB and various RRHs) may be deployed to serve a UE. As illustrated in the example 802, a macro eNB 806 and RRHs 808 and 810 may be connected with a fiber for control and data transmissions. In the example 802, the macro eNB 806 and the RRHs 808-810 may be configured with different physical cell identifiers (PCIs).

In the example 804, a Macro eNB and RRHs may be configured with the same PCI resulting into a common PDCCH control region. Thus, for the example 804 of heterogeneous CoMP deployment, a Macro cell (e.g., defined by a Macro eNB (812) and its associated small cells (e.g., defined by RRHs 814 and 816) may be configured with the same CRS. For certain aspects, two or more NZP CSI-RS configurations (with a same or different virtual cell IDs) and two or more IMR configurations may be used to differentiate different cells of the same CRS.

Figure 9:
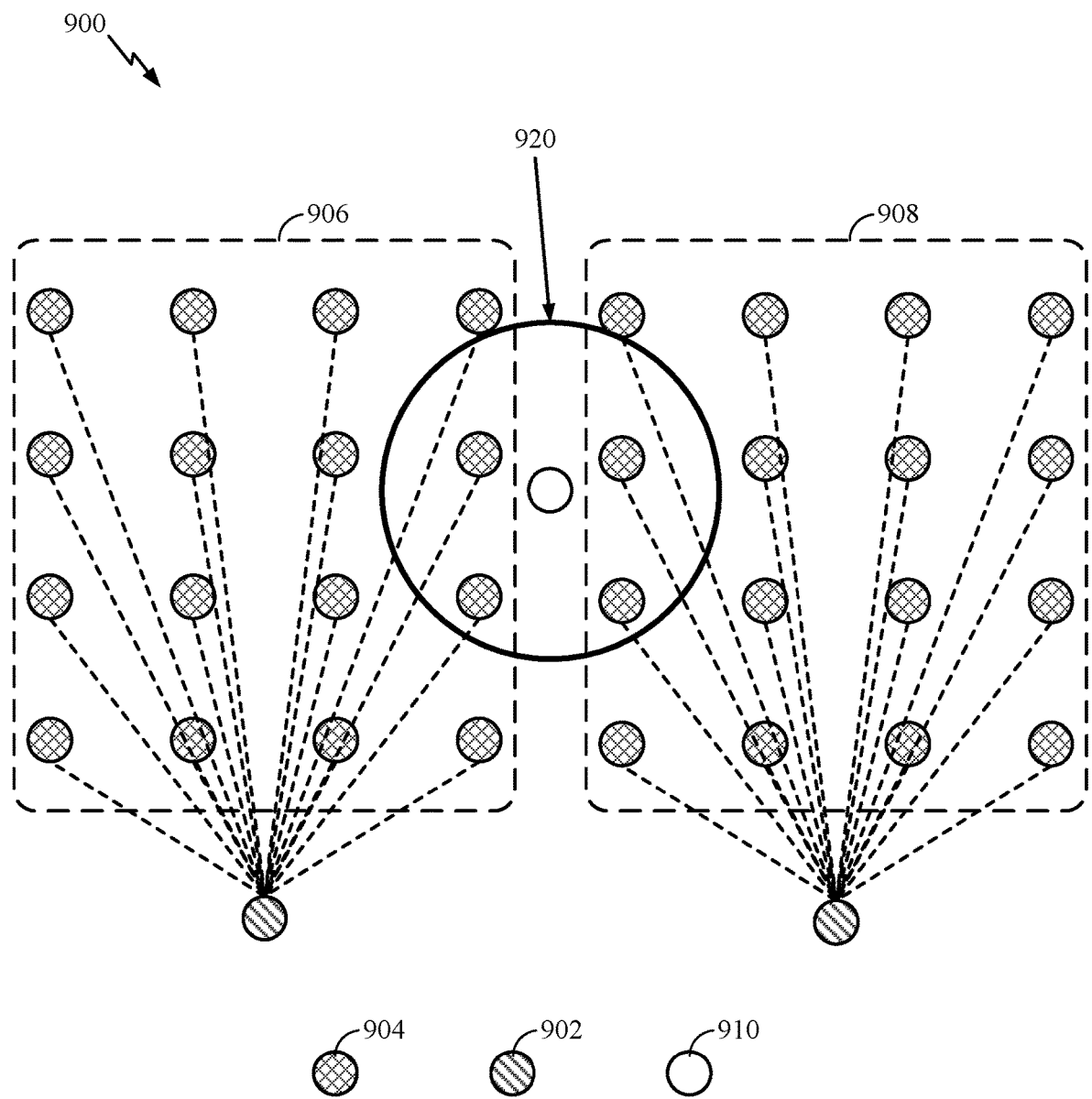
FIG. 9 is a diagram illustrating an example CoMP deployment architecture, according to aspects of the present disclosure.

FIG. 9 is a diagram illustrating an example CoMP deployment architecture 900, according to aspects of the present disclosure. Generally, conventional CoMP deployments include a macro cell 902 and its associated small cells 904 where each small cell is associated with a single macro cell. Coverage provided by a first CoMP deployment 906 also typically does not overlap or overlaps minimally with coverage provided by a second CoMP deployment 908, resulting in boundaries between deployments. A UE 910 on the boundary of the first and second CoMP deployments may see small cells from both the first and second CoMP deployments. If the UE 910 is served by the first CoMP deployment 906, then it may be interfered by the second CoMP deployment 908, and vice versa. Where the UE 910 is on the boundary between deployments, the interference is more significant than if the UE 910 were more centrally located within a deployment.

Example Overlapping Cluster Architecture for CoMP

As discussed above with reference to FIG. 9, conventional CoMP deployments may include a macro cell 902 and its associated small cells 904 where each small cell is associated with a single macro cell. In an aspect, the macro cell 902 includes a Node B and each of the small cells 904 includes a transmission point (TP). According to aspects of the present disclosure, TPs may comprise nodes of various types capable of transmitting to a UE (e.g., UE 910) and these nodes may not have significant processing power. For example, a TP includes one or more antennas and may be fiber connected to a Node B for backhaul. As shown in FIG. 9 each TP 904 is connected to a Node B 902. In some cases, the TP does not perform any TP side processing except to convert Radio Frequency (RF) signals to a format compatible with the fiber connection to the Node B. Generally, a set of TPs is fiber connected to one Node B. A set of one or more TPs connected to a Node B comprises a cluster. In one example, a star structure is used to connect an eNB to a set of TPs forming the cluster. As shown in FIG. 9, each of the CoMP deployments 906 and 908 is an independent cluster, where each cluster includes a set of TPs 904 connected to a single Node B 902. In certain aspects, if each TP is connected to just one Node B, the clusters will be non-overlapping and resulting in cluster boundaries as seen in FIG. 9.

According to aspects of the present disclosure, a set of TPs operating as a part of a CoMP deployment (e.g., cluster of TPs) may include a CoMP Coordination Set (CCS) comprising a set of TPs which are close to and serve a particular UE. As shown in FIG. 9, the TPs 904 included in the circle 920 is the CCS for UE 910. A particular TP may or may not be included in a CCS of a particular UE based on how close the particular TP is in relation to the particular UE. How close the particular TP is in relation to the particular UE may be based on, for example, signal strength, Signal to Noise Ratio (SNR), or other characteristic of a signal between the TP and the UE. For an UL transmission, the TPs in the CCS may comprise the TPs capable of receiving an UL transmission from the UE with a reasonable strength. For a DL transmission, the DL transmission from the TPs in the CCS will be reasonably strong when received by the UE.

A cluster serving a UE may be referred to as a serving cluster and the serving cluster generally includes (at least partially) a CoMP coordination set (CCS) of the UE. The CCS may be used for both UL and DL transmissions. Where a UE receives signals from TPs that are part of another cluster other than the UE's serving cluster, the other cluster is an interfering cluster. Interfering clusters may contain one or more of the TPs in the CCS of a UE. For example, as shown in FIG. 9, either of the two clusters 906 and 908 may be serving clusters for the UE 910 as each cluster includes two TPs 904 of the UEs CCS 920. However, regardless of which of the two clusters 906 or 908 serves the UE, the other cluster will be an interfering cluster as it has TPs of the UEs CCS 920. A particular UE may have zero or more interfering clusters and the eNB of the interfering cluster may consider taking steps to avoid generating a significant interfering signal to the particular UE, such as by making the UE a zero-forcing (ZF) or signal-to-leakage ratio (SLR) target.

In certain aspects, as noted above, if each TP is connected to just one Node B, the clusters will be non-overlapping and resulting in cluster boundaries as seen in FIG. 9. As shown in FIG. 9, with non-overlapping clusters 906 and 908, the UE may get caught up in a situation where the UE is located between the two cluster boundaries and the UE's CCS rides across the cluster boundaries. In other words, the UE's CCS may have TPs in both the non-overlapping clusters. This may lead to non-efficient ZF and/or SLR. In certain aspects, a cluster structure allowing overlapping of clusters may ensure that the UE's CCS is always completely covered by at least one cluster. A TP may be fiber connected to one or more Node Bs. A set of one or more TPs connected to a Node B comprises a cluster of TPs and a single TP may be a member of one or more clusters if the single TP is connected to multiple Node Bs, thus leading to overlapping clusters.

Figure 10:
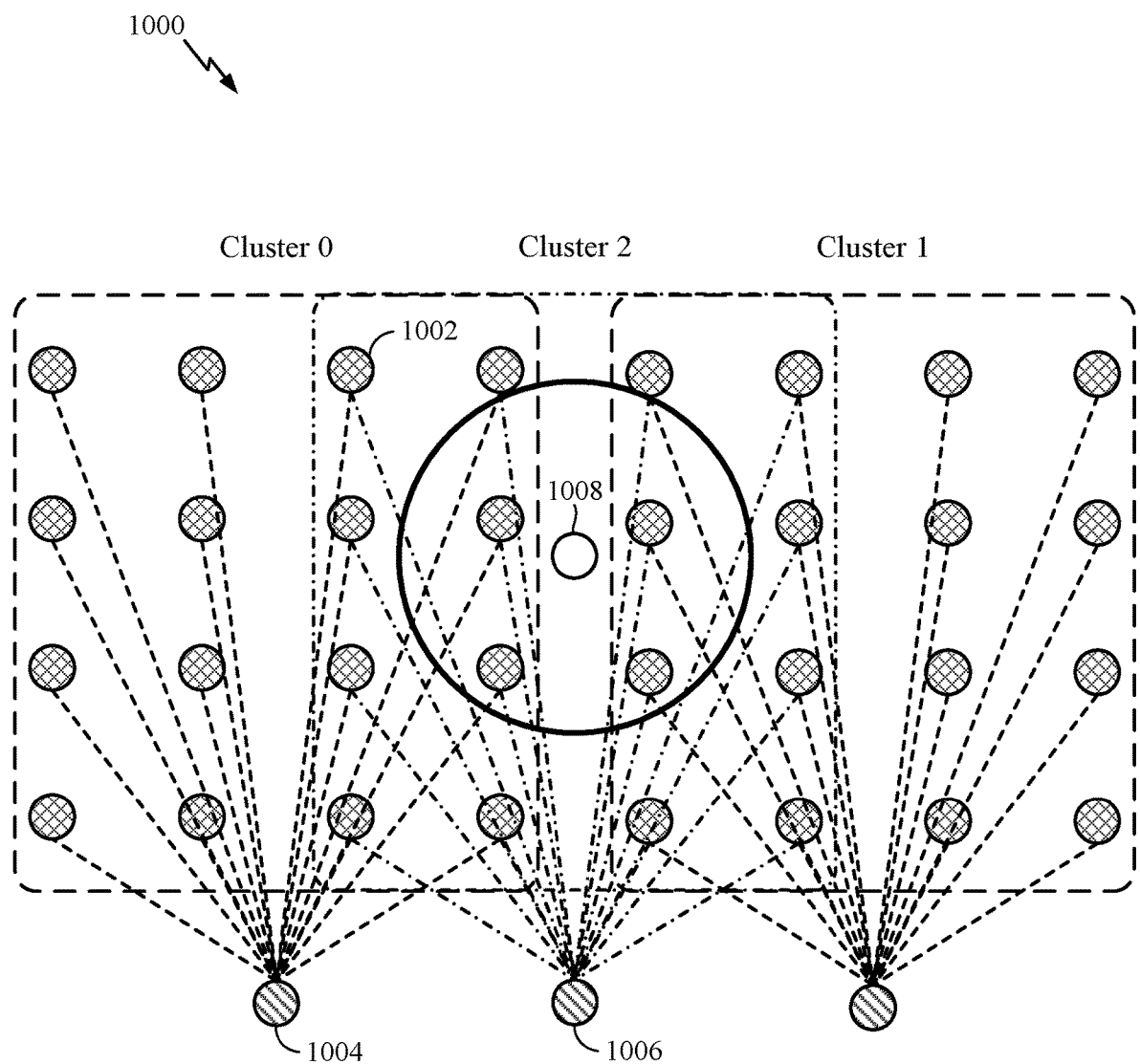
FIG. 10 is a diagram illustrating an example overlapping cluster architecture 1000, according to aspects of the present disclosure.

FIG. 10 is a diagram illustrating an example overlapping cluster architecture 1000, according to aspects of the present disclosure. As shown, individual TPs may be connected to more than one Node B and multiple clusters may share a single TP. As shown in FIG. 10, a TP 1002 may be connected to both a first Node B 1004 and a second Node B 1006. Each Node B continues to be associated with a cluster based on the TPs that are connected to the Node B, while individual TPs may be members of one or more clusters. For example, here TP 1002 is a member of both cluster 0 and cluster 2. In certain aspects, where a TP (e.g., TP 1006) is a member of more than a single cluster, the clusters overlap each other.

According to aspects of the present disclosure, when overlapping clusters are allowed, the CCS of a UE may be completely covered by a single cluster. If clusters may overlap, a third cluster may be defined, overlapping with both the first and second cluster such that any CCS for a UE is covered by either the first, second, or third clusters. For example, a UE 1008 may be located in a gap between cluster 0 and cluster 1, but is fully covered by cluster 2 and associated Node B 1006. Cluster 2 overlaps both cluster 0 and cluster 1. This overlap may be significant enough such that the UE 1008 is always completely covered by at least one cluster. For example, as shown in FIG. 10, cluster 2 may be the serving cluster for UE 1008, while clusters 0 & 1 are interfering clusters. In an aspect, there is a high SNR for UE 1008 as UE 1008 is located in the center of cluster 2.

Certain aspects, of the present disclosure provide techniques for managing CCS for UEs, serving clusters and interfering clusters in CoMP architectures having overlapping clusters of TPs.

Figure 11:
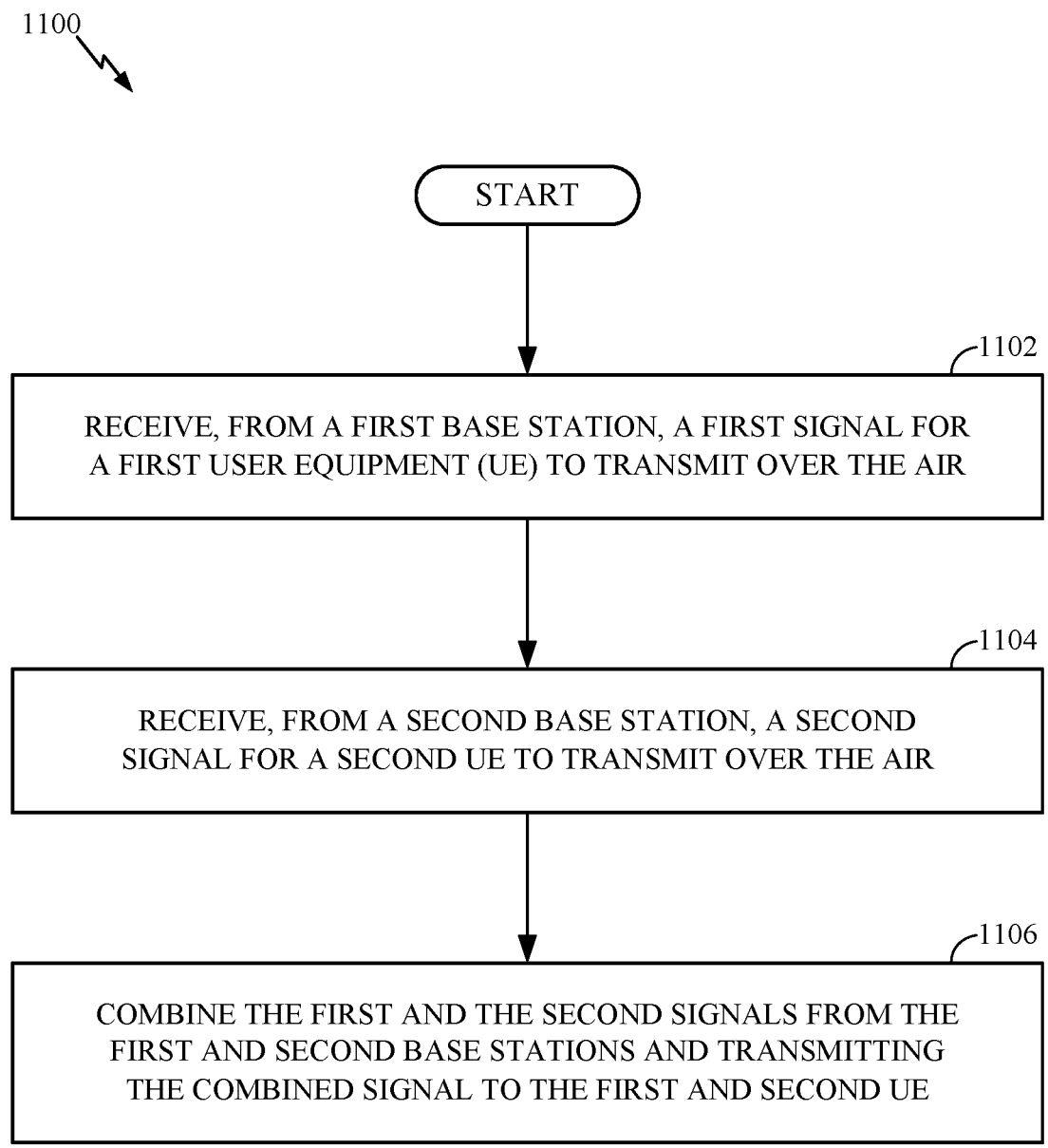
FIG. 11 is a flowchart illustrating example operations 1100 for wireless communications by a transmission point (TP), according to aspects of the present disclosure.

FIG. 11 is a flowchart illustrating example operations 1100 for wireless communications by a transmission point (TP), according to aspects of the present disclosure. Operations 1100 begin, at 1102, by receiving, from a first base station, a first signal for a first user equipment (UE) to transmit over the air. At 1104, the TP receives, from a second base station, a second signal for a second UE to transmit over the air. At 1106, the TP combines the first and the second signals from the first and second base stations and transmits the combined signal to the first and second UE.

In an aspect, the transmission point is connected to the first and the second base stations via a fiber backhaul connection. In an aspect, the transmission point is a member of a first CCS serving the first UE and a second CCS serving the second UE.

Figure 12:
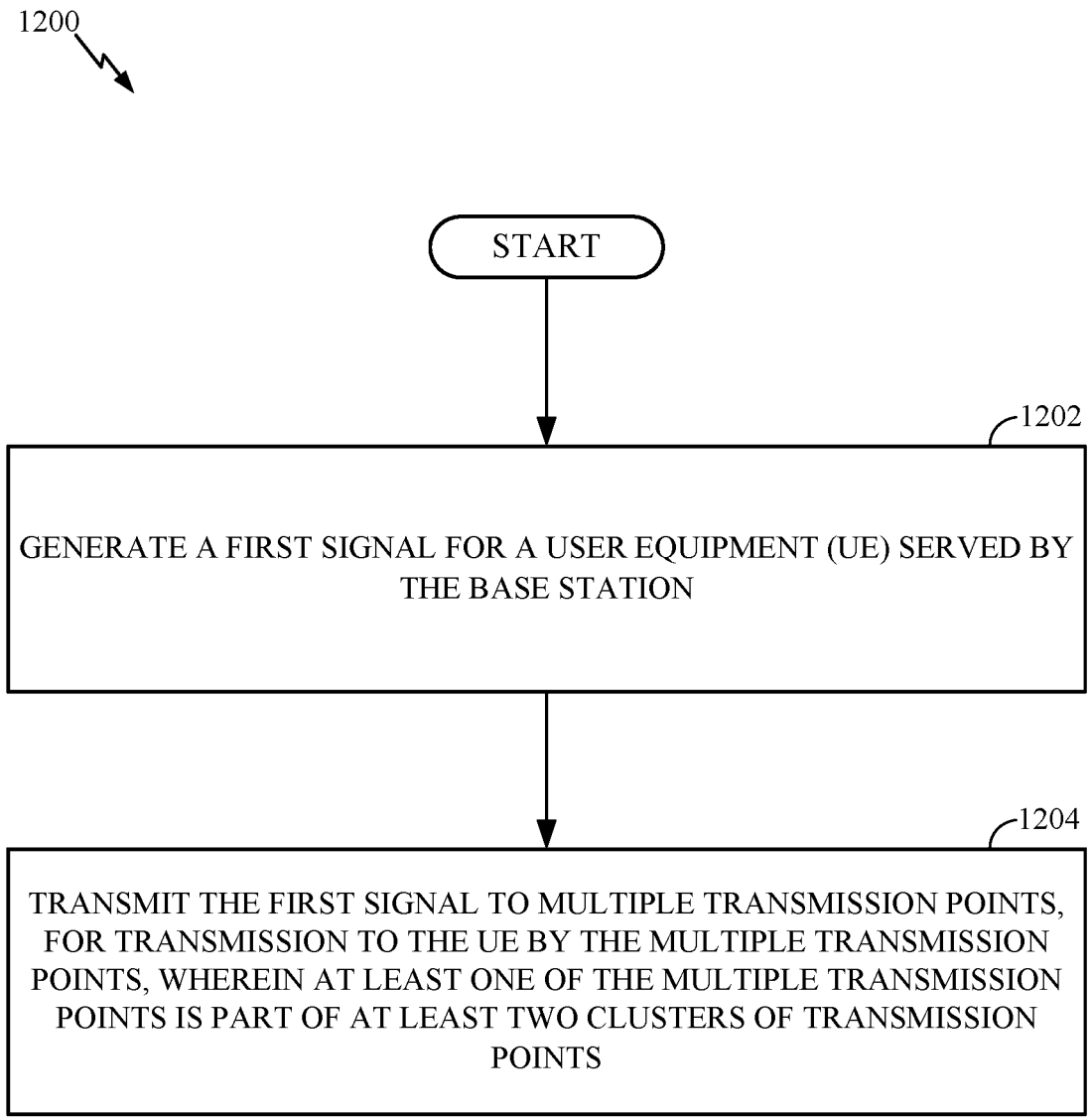
FIG. 12 is a flowchart illustrating example operations 1200 for wireless communications by a base station, according to aspects of the present disclosure.

FIG. 12 is a flowchart illustrating example operations 1200 for wireless communications by a base station, according to aspects of the present disclosure. Operations 1200 begin, at 1202, by generating a first signal for a UE served by the base station. At 1204, the base station transmits the first signal to multiple TPs, for transmission to the UE by the multiple TPs, wherein at least one of the multiple TPs is part of at least two clusters of transmission points.

In an aspect, each of the multiple TPs is connected to the base station via a fiber backhaul. In an aspect, the multiple transmission points are part of a serving cluster served by the base station and are part of a CCS serving the UE. In an aspect, the at least two clusters include the serving cluster and an overlapping interfering cluster. In an aspect, the first signal includes information for transmitting the first signal to the UE while mitigating interference for another UE. In an aspect, the interference mitigation is performed using at least one of zero-forcing or signal-to-leakage ratio methods.

As discussed above, a single TP may be connected to more than one Node B and may be a member of more than a single cluster. This connection may be a fiber connection and the TP may be a relatively simple device. For example, a TP, on the DL, may receive a DL waveform from a Node B and convert this DL waveform to an RF signal and transmit the RF signal. Thus, a signal is constructed by a Node B and the TP takes the signal received from the Node B and transmits the signal as an RF signal on the DL. On the UL, the TP receives a RF signal from the UE, converts the RF signal to a UL waveform and transmits the UL waveform to the Node B for processing. Where a single TP is connected to multiple clusters, on the DL, the TP may receive signals from multiple connected Node Bs. The TP may sum (e.g., combine) the multiple signals together and transmit the summed signal. On the UL, the TP may forward a UL transmission from one or more UEs combined over the air to all Node Bs the TP is connected to. In an aspect, a TP may receive a signal from multiple UEs that are in proximity to the TP and have a receive signal strength above a threshold value. In an aspect, the received signals from the multiple UEs are combined over the air and are not distinguishable at the TP. In an aspect, the TP forwards the combined signal to one or more base stations the TP is connected to for further processing.

Where the TP has a separate physical cell ID than the Node B, the TP may also utilize signals constructed by the Node B having the physical cell ID (PCI) of the TP. A PCI is determined by the primary synchronization signal (PSS) and the secondary synchronization signal (SSS). Where the TP is a part of multiple clusters, the TP may assume multiple identities and transmit multiple copies of the PSS/SSS in different subframes at the direction of the connected Node Bs.

According to aspects of the present disclosure, a set of TPs may share a single PCI. For example, TPs in the part of a first cluster which overlaps part of a second cluster may share a PCI. This PCI may be different from areas of the first and second clusters which do not overlap with other clusters. This allows a UE to still be able to move across the various parts of a cluster and determine locations and monitor the CCS while still allowing for increased signal strength from multiple TPs broadcasting the same PCI.

Figure 13:
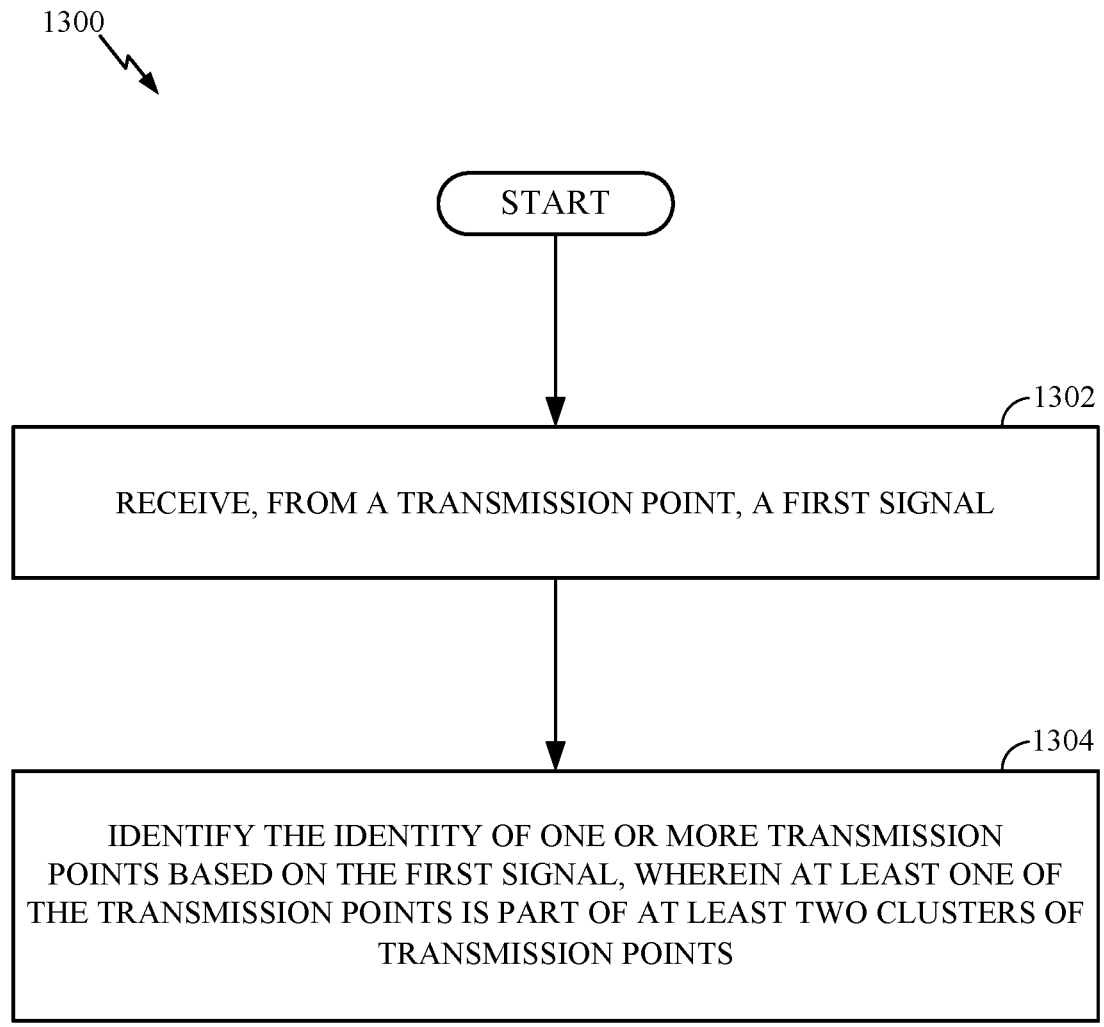
FIG. 13 is a flowchart illustrating example operations 1300 for wireless communications by a user equipment (UE), according to aspects of the present disclosure.

FIG. 13 is a flowchart illustrating example operations 1300 for wireless communications by a user equipment (UE), according to aspects of the present disclosure. Operations 1300 begin, at 1202, by receiving, from a transmission point, a first signal. At 1204, identifying the identity of one or more transmission points based on the first signal, wherein at least one of the transmission points is part of at least two clusters of transmission points. In an aspect, the first signal is PSS or SSS.

The CCS for a UE may be determined by one or more Node Bs, for example, a Node B of a serving cluster. For example, on the UL side the UE may transmit sounding reference signals (SRS). The SRS are received by one or more TPs, for example, TPs in proximity to the UE. The TPs may then forward these signals to the Node B. The Node B may then determine, for example, a signal strength associated with particular TPs of the one or more TPs and estimate the channel from the UE to the particular TP. For example, the Node B may compare this signal strength against a threshold value, and the particular TPs with associated signal strengths above the threshold value may be included as a part of the CCS for serving the UE. The estimated channel from the UE may also be used for beamforming vector design.

On the DL side, a UE may receive signals transmitted from one or more TPs. These signals may be PSS/SSS or PSS/SSS like signals from the one or more TPs. The UE may identify the identity of a particular TP of the one or more TPs based on the received signals and determine a signal strength associated with the particular TPs. The UE may then forward this information to the Node B. The Node B may then determine which particular TPs, of the one or more TPs may be included as a part of the CCS for serving the UE. For example, the Node B may compare the signal strength against a threshold value and the particular TPs with associated signal strengths above the threshold value may be included as a part of the CCS for serving the UE. Alternatively, the UE may determine which particular TPs for inclusion in the serving CCS and forward this information to the Node B.

The UE may be served or interfered by the TPs in the CCS. Where TPs may interfere with a UE, the TPs may consider the UE for ZF or SLR operations. For example, TPs may receive UL transmissions from multiple UEs where the received signal from UEs are combined over the air and cannot be distinguished at the TP. The TP forwards this received signal to the Node B, which may perform various interference mitigating techniques on the received signal, such as ZF or SLR. On the DL side, the Node B may, for example, transmit a signal using a beamforming vector to the TPs for transmission by the TPs to a UE. The TPs in the CCS of a UE may potentially serve a second UE. The signal serving the second UE may act as interference to the first UE. When designing the beamforming vector to the second UE, the cluster serving the second UE may apply interference reduction techniques for first UE, such as ZF or SLR. TPs which are not close to the UE, and thus not a part of the CCS, may interfere with transmissions from the CCS, but this interference should be minimal and not greatly increase the error floor for the UE.

Figure 14:
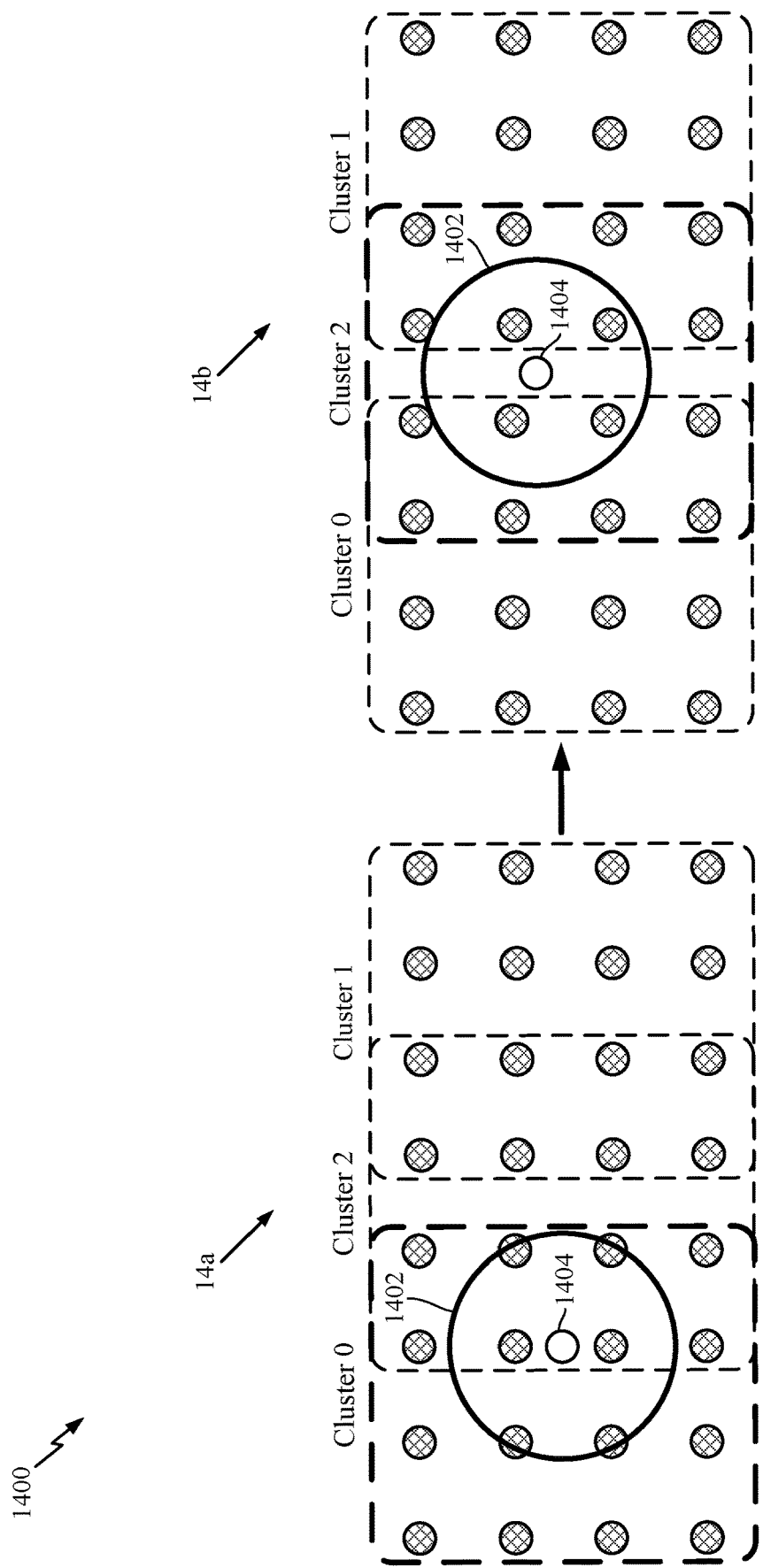
FIG. 14 is a diagram illustrating an example mobility scenario for an overlapping cluster architecture, according to aspects of the present disclosure.

FIG. 14 is a diagram illustrating an example mobility scenario for an overlapping cluster architecture 1400, according to aspects of the present disclosure. As a UE moves, the CCS changes to follow the UE. The CCS range 1402 here represents an area around the UE 1404 sufficiently close to the UE where the TPs within the range are part of the CCS for UE 1404. The serving cluster is the cluster that covers the CCS. As the CCS moves from an area covered by cluster 0 to an area covered by cluster 2 the serving cluster changes from cluster 0 to cluster 2. For example, a UE 1404 may, as it moves, discover new TPs and may add or remove TPs from the UE's 1404 CCS and report CCS information to the serving Node B. As shown in FIG. 14, before the UE moves in 14a, cluster 0 is the serving cluster and cluster 2 is the interfering cluster. After, the UE moves in 14b, cluster 2 is the serving cluster and cluster 1 is the interfering cluster.

In some cases, a CCS may not be fully covered by any one cluster. For example, if there is an insufficient amount of overlap between clusters. Where a CCS is not fully covered by any one cluster, the cluster which covers most of the CCS may be selected as the serving cluster. Weighting based on, for example, signal strength, may be utilized for selecting the serving cluster where clusters with a higher signal strength may be weighted more heavily and preferred over clusters with a lower signal strength.

Where more than a single cluster fully covers the CCS, for example if there is too much overlap between clusters, then any of the clusters fully covering the CCS may be selected as the serving cluster. Clusters which are not selected as serving clusters may then be considered interfering clusters as they cover one or more of the TPs of the UE's CCS and are not the serving cluster.

Figure 15:
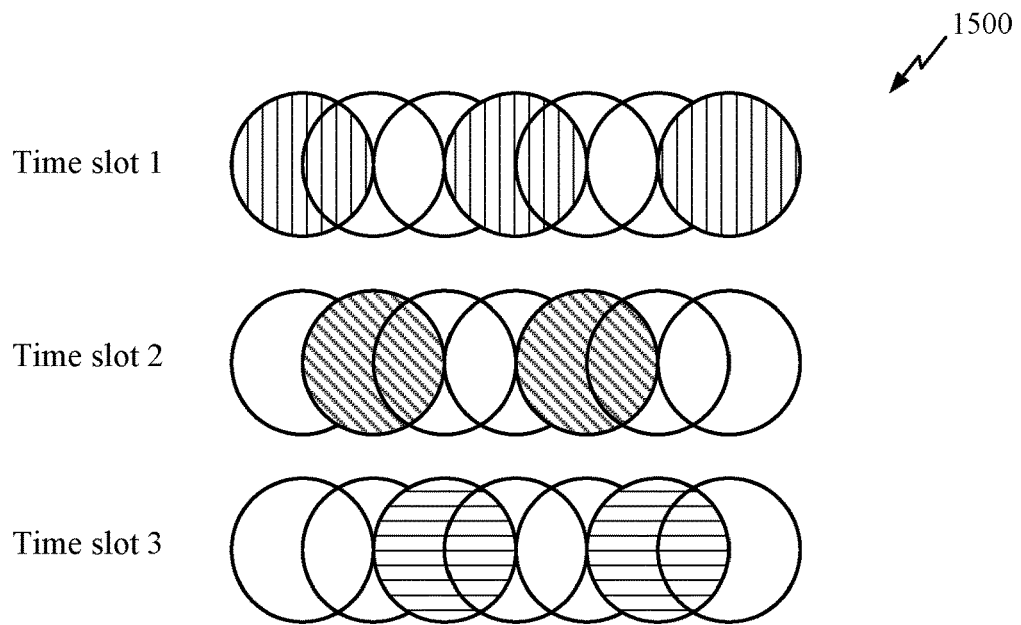
FIG. 15 is a diagram illustrating an example cluster coloring, according to aspects of the present disclosure.

FIG. 15 is a diagram illustrating an example cluster coloring 1500, according to aspects of the present disclosure. Where the coverage areas of clusters may be overlapped, clusters may be assigned a color for use when serving UEs using TDM. For example, each color may be assigned to clusters such that overlapping clusters do not use the same color. The overlap areas are covered by multiple clusters, each with a different color. As shown in FIG. 15, TDM may then be performed among the clusters of multiple colors such that clusters with different colors are not active at the same time. TPs in the overlap area may be seen by both UEs.

Figure 16:
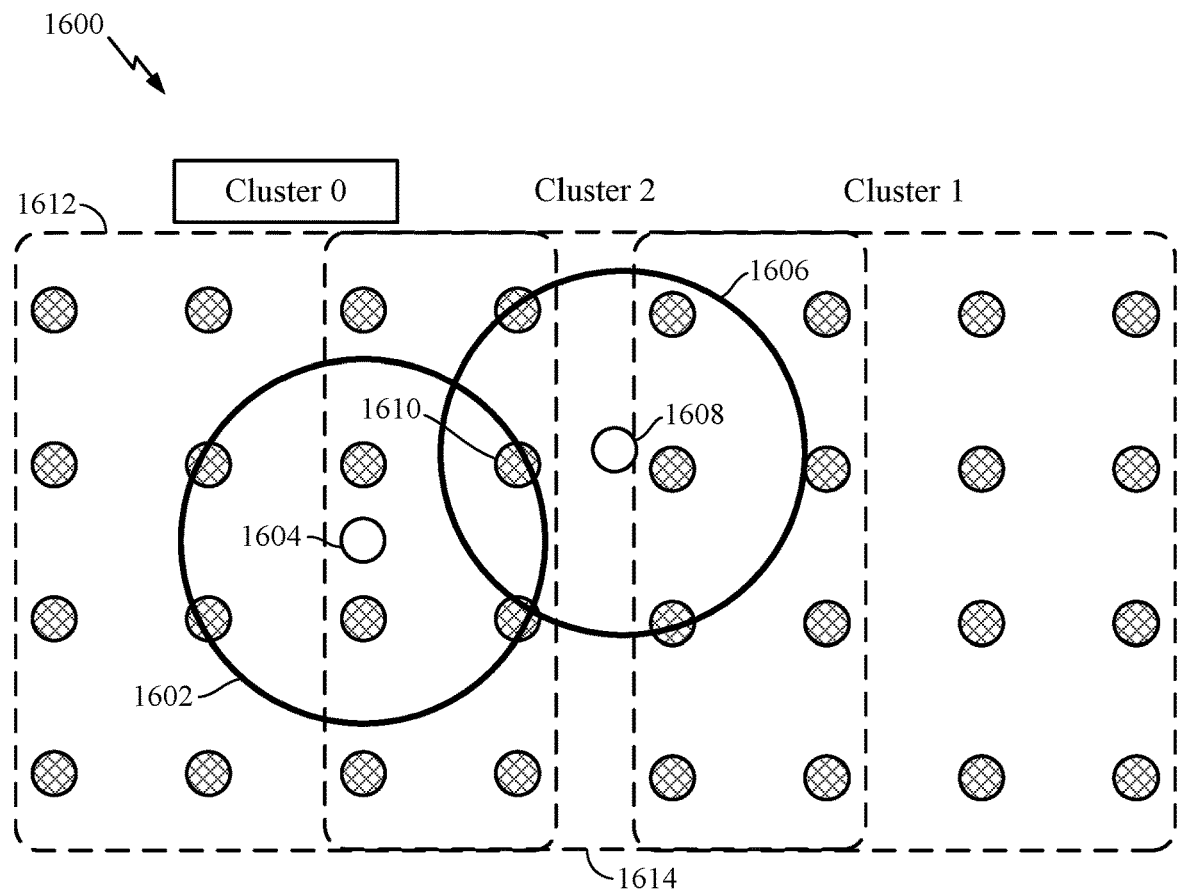
FIG. 16 is a diagram illustrating an example of wireless resource reuse for overlapping clusters, according to aspects of the present disclosure.

FIG. 16 is a diagram illustrating an example of wireless resource reuse for overlapping clusters 1600, according to aspects of the present disclosure. Multiple UEs with overlapping CCS may be served at the same time when the interference from the interfering cluster is taken into account. A first UE 1064 served by cluster 0 and a second UE 1608 served by cluster 1, with overlapping CCs can be served at the same time as long as the TPs in both CCs consider both UEs when computing a beamforming vector. For example, a first CCS range 1602 of a first UE 1604 includes 6 TPs and a second CCS range 1606 of a second UE 1608 includes 5 TPs. A single TP 1610 is common to the CCS ranges of the first UE 1604 and a CCS of the second UE 1608. Node Bs of a first cluster 1612 and a second cluster 1614 may determine the location of the first and second UEs based on the TPs in the CCSs. As TP 1610 will be seen by both the first UE 1604 and the second UE 1608, interference mitigation may be applied, for example using ZF precoded beamforming transmissions from the TPs. For example, a transmission from TP 1610 to the first UE 1604 may be ZF precoded such that the beamforming vector will be nulled at the second UE 1608. Similarly, transmissions from TP 1610 to the second UE 1608 may be ZF precoded such that the beamforming vector will be nulled at the first UE 1604, allowing TP 1610 to jointly serve both the first UE 1604 and second UE 1608.

According to aspects of the present disclosure, during downlink operations, a UE may be served by a single Node B associated with the serving cluster. The UE may also potentially receive interference by all the TPs in its CCS. To reduce this interference, the serving cluster and all interfering clusters may need to consider the UE when beamforming other UEs, and a DL channel to a UE is available from all serving and interfering clusters. For example, the Node B may consider the UE when determining a beamforming vector to point a signal to the UE while nulling other UEs and reducing interference to the other UEs.

According to aspects of the present disclosure, an UL transmission from a UE may be picked up by all serving and interfering clusters. UL scheduling may be provided by the serving cluster and the serving cluster performs decoding on the UL transmission. Interfering clusters receiving the UL transmission may perform receive beamforming to null the UL transmission arriving at the interfering cluster to help reduce interference from the UL transmission.

A UE may transmit sounding reference signals (SRS) which the Node B measures and using channel reciprocity, to predict the DL channel for beamforming. SRS transmissions may be orthogonalized for better channel estimation absent interference from other UEs. Where two UEs are relatively far away from each other and the same TP is not used to serve both UEs (i.e., the CCSs are non-overlapping) the SRS is orthogonalized in the space domain and the two UEs may use the same RE for SRS as interference by the two UEs is relatively small. For UEs that are closer together, from a TP perspective, orthogonalization may be performed by scheduling different UEs SRS in different resource elements.

Figure 17:
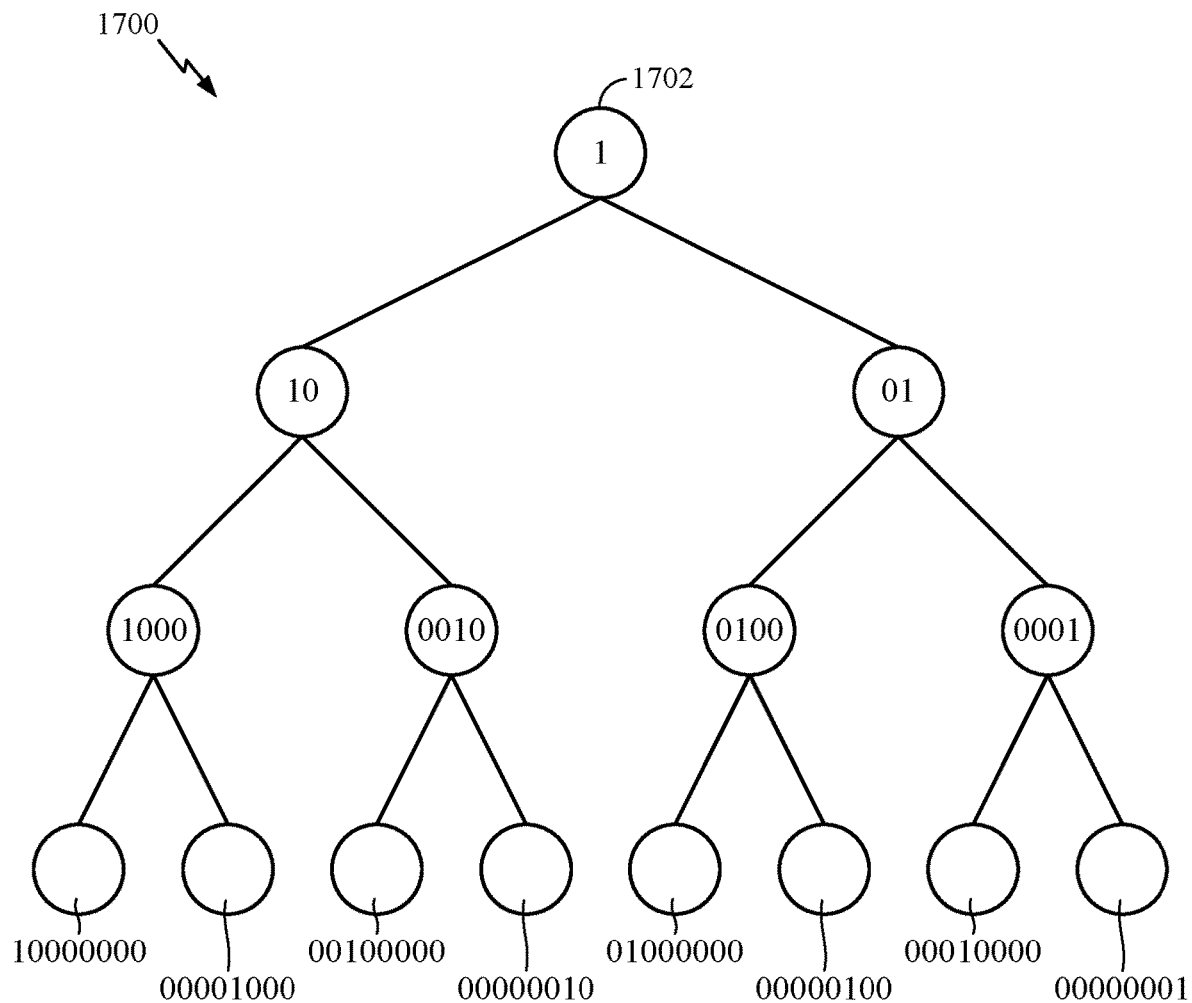
FIG. 17 is a diagram illustrating an example sounding reference signal scheduling binary tree, according to aspects of the present disclosure.

FIG. 17 is a diagram illustrating an example SRS scheduling binary tree 1700, according to aspects of the present disclosure. An OFDM symbol for SRS may be divided into 8 interlaces and these interlaces may be allocated to the UEs to avoid potential collisions. Two UEs with overlapping CCSs may not be scheduled to transmit SRSs in the same interlace as colliding SRS transmissions between the two UEs may result in unreliable SRS measurements. According to aspects of the present disclosure, SRS scheduling may be based on CCSs. A SRS scheduling binary tree 1700 may be used to define SRS resources. As the Node B of each cluster know which TPs are a part of any particular UEs CCS, the Node B may monitor for overlapping CCSs, divide the interlaces of an OFDM symbol available for SRS transmission in an interleaved manner, and assign the interlaces to the UEs. Each level of the SRS scheduling binary tree 1700 may represent a level of division of tones for a RE for interleaved SRS transmission and the binary tree is traversed based on the number of overlapping CCSs. For example, where two UEs are in the same cluster but do not have overlapping CCSs, the two UEs may be scheduled based on the root node 1702 where each UE may transmit on every tone. Where two UEs have overlapping CCSs, SRS transmissions may be scheduled according to the second level of the SRS scheduling binary tree 1700 and each UE may transmit for half of the tones of the OFDM symbol. As more UEs overlap, each UE may be scheduled to transmit for a quarter of the interlaces, and down to a single interlace. At the lowest level of the SRS scheduling binary tree 1700.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, estimating, and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a maximum available transmit power of the UE, instructions for semi-statically configuring a first minimum guaranteed power available for uplink transmission to a first base station and a second minimum guaranteed power available for uplink transmission to a second base station, and instructions for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a transmission point, comprising:
   receiving, from a first base station, a first signal for a first user equipment (UE) to transmit over the air;
   receiving, from a second base station, a second signal for a second UE to transmit over the air; and
   combining the first and the second signals from the first and second base stations; and
   transmitting over the air the combined signal to the first and second UEs,
   wherein the transmission point is part of at least two clusters of transmission points, the at least two clusters including a first cluster of transmission points and a second cluster of transmission points, wherein each transmission point of the first cluster of transmission points is connected to the first base station and wherein each transmission point of the second cluster of transmission points is connected to the second base station.

2. The method of claim 1, wherein the transmission point is connected to the first and second base stations via a fiber backhaul connection.

3. The method of claim 1, wherein the transmission point is a member of a first CoMP coordination set (CCS) serving the first UE and a second CCS serving the second UE.

4. The method of claim 3, further comprising:
   receiving, from the first UE and the second UE, a transmission having a received signal strength above a threshold value, wherein the received signal from the first UE and the second UE are combined over the air and cannot be distinguished at the transmission point; and
   transmitting the received signal to the first base station and the second base station.

5. The method of claim 1, further comprising transmitting a first schedule for transmitting a first sounding reference signal (SRS) to the first UE, wherein the first schedule does not overlap with a second schedule for transmitting a second SRS to the second UE.

6. The method of claim 5, wherein the first SRS transmission is scheduled for transmission by the first UE as a part of an interleaved SRS transmission with the second UE.

7. A method for wireless communications by a base station, comprising:
   generating a first signal for a User Equipment (UE) served by the base station; and
   transmitting, the first signal to multiple transmission points, for transmission to the UE by the multiple transmission points, wherein at least one of the multiple transmission points is part of at least two clusters of transmission points, the at least two clusters including a first cluster of transmission points and a second cluster of transmission points, wherein each transmission point of the first cluster of transmission points is connected to the base station and wherein each transmission point of the second cluster of transmission points is connected to another base station.

8. The method of claim 7, wherein each of the multiple transmission points is connected to the base station via a fiber backhaul connection.

9. The method of claim 7, further comprising:
   receiving, from one or more of the multiple transmission points, a second signal having a received signal strength above a threshold value, wherein the received second signal comprises a combined signal from the UE and another UE served by the one or more transmission points.

10. The method of claim 7, wherein the first signal includes information for transmitting the first signal to the UE while mitigating interference for another UE.

11. The method of claim 10, wherein the transmitting through the multiple transmission points includes beamforming and interference mitigation with at least one of zero-forcing or signal-to-leakage ratio methods.

12. The method of claim 10, further comprising:
   transmitting, to one or more of the multiple transmission points, a first schedule for transmitting a first sounding reference signal (SRS) to the UE, wherein the first schedule does not overlap with a second schedule for transmitting a second SRS to the other UE.

13. The method of claim 12, wherein the first SRS transmission is scheduled for transmission by the UE as a part of an interleaved SRS transmission with the other UE.

14. The method of claim 7, further comprising:
   estimating a received signal strength of a second signal transmitted by the UE via one or more of the multiple transmission points; and
   determining, based on the estimated received signal strength from the one or more transmission points, a set of transmission points and a base station for serving the UE.

15. The method of claim 14, wherein the determining is based on a comparison of the received signal strength and a threshold value for each transmission point of the one or more transmission points.

16. A method for wireless communications by a user equipment (UE), comprising:
   receiving, from a transmission point, a first signal; and
   identifying an identity of one or more transmission points based on the first signal, wherein at least one of the transmission points is part of at least two clusters of transmission points, the at least two clusters including a first cluster of transmission points and a second cluster of transmission points, wherein each transmission point of the first cluster of transmission points is connected to a first base station and wherein each transmission point of the second cluster of transmission points is connected to a second base station.

17. The method of claim 16, further comprising:
   determining a signal strength of the one or more identified transmission points;
   reporting the determined signal strength of the one or more identified transmission points to a serving base station of the first and second base stations for a determination of a set of transmission points, from the one or more identified transmission points; and
   receiving a second signal from the set of transmission points.

18. The method of claim 16 wherein the first signal includes at least one of a Primary Synchronization Signal (PSS) or a Secondary Synchronization Signal (SSS).

19. An apparatus for wireless communications by a transmission point, comprising:
    means for receiving, from a first base station, a first signal for a first user equipment (UE) to transmit over the air;
    means for receiving, from a second base station, a second signal for a second UE to transmit over the air; and
    means for combining the first and the second signals from the first and second base stations; and
    means for transmitting over the air the combined signal to the first and second UEs,
    wherein the transmission point is part of at least two clusters of transmission points, the at least two clusters including a first cluster of transmission points and a second cluster of transmission points, wherein each transmission point of the first cluster of transmission points is connected to the first base station and wherein each transmission point of the second cluster of transmission points is connected to the second base station.

20. The apparatus of claim 19, wherein the transmission point is connected to the first and second base stations via a fiber backhaul connection.

21. The apparatus of claim 19, wherein the transmission point is a member of a first CoMP coordination set (CCS) serving the first UE and a second CCS serving the second UE.

22. The apparatus of claim 21, further comprising:
    means for receiving, from the first UE and the second UE, a transmission having a received signal strength above a threshold value, wherein the received signal from the first UE and the second UE are combined over the air and cannot be distinguished at the transmission point; and
    means for transmitting the received signal to the first base station and the second base station.

23. The apparatus of claim 19, further comprising means for transmitting a first schedule for transmitting a first sounding reference signal (SRS) to the first UE, wherein the first schedule does not overlap with a second schedule for transmitting a second SRS to the second UE.

24. The apparatus of claim 23, wherein the first SRS transmission is scheduled for transmission by the first UE as a part of an interleaved SRS transmission with the second UE.

* * * * *